Sept. 15, 1931.  M. CORNU  1,823,089
ALTERNATING CURRENT ELECTRICAL MACHINE
Filed Oct. 13, 1928  2 Sheets-Sheet 1

Inventor:
Maurice Cornu,
By: Smith & Michael, Attorneys.

Sept. 15, 1931.                M. CORNU                    1,823,089
            ALTERNATING CURRENT ELECTRICAL MACHINE
                    Filed Oct. 13, 1928       2 Sheets-Sheet 2
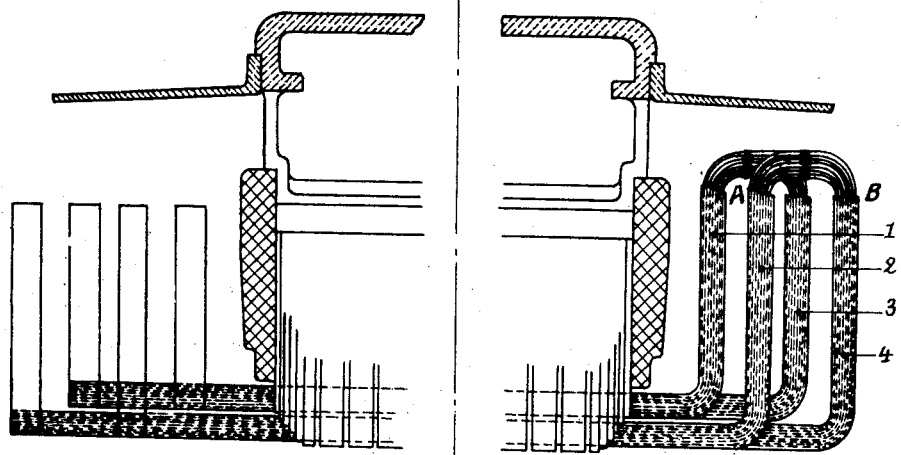
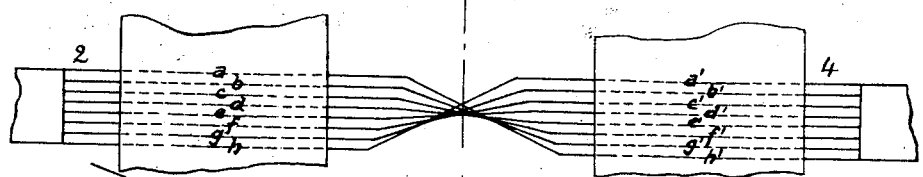
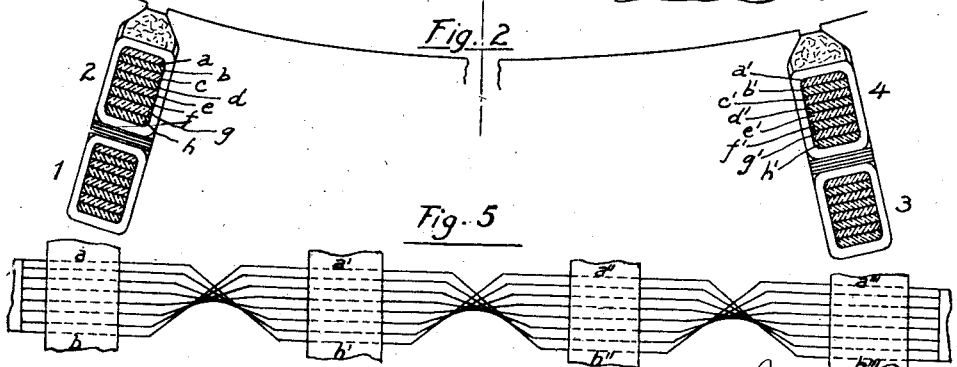
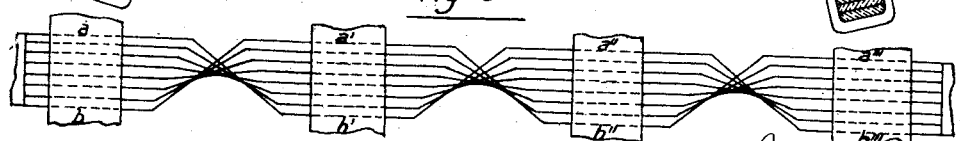

Patented Sept. 15, 1931

1,823,089

UNITED STATES PATENT OFFICE

MAURICE CORNU, OF MARCINELLE-LEZ-CHARLEROI, BELGIUM, ASSIGNOR TO ATELIERS DE CONSTRUCTIONS ELECTRIQUES DE CHARLEROI, OF BRUSSELS, BELGIUM, A BELGIAN SOCIÉTÉ ANONYME

ALTERNATING CURRENT ELECTRICAL MACHINE

Application filed October 13, 1928, Serial No. 312,368, and in Belgium October 29, 1927.

This invention relates to alternating current electrical machines and consists in an improved method of winding the stators of such machines, avoiding copper losses due to eddy currents produced by the transverse magnetic flux in the stator slots.

In the stator windings of turbo-alternators, there are ordinarily employed conductors composed of separately insulated laminations which are either reversed in their relative order or changed in order by successively transferring the top laminations to the bottom position, or vice versa, at various points in the coil formed by the conductor, in such a way as to avoid the supplementary losses produced in the copper by the dispersion flux transverse to the slots.

The windings are in the most frequent case of the type called "evolute windings."

The present invention, which is applicable to stator windings with laminated conductors and end-conductors of the evolute type, has for its object to provide an improved method of carrying out the connection or joining together of the slot-conductors located at corresponding radial positions, in order to secure the compensation in groups of two conductors or in groups of an even number of conductors, of the electromotive forces due to the transverse flux in the slots, this being done without any crossing or torsion in the mechanical sense of the laminations, either internally or externally of the slots.

In the course of the description which follows, reference is made to the five figures of the accompanying drawings, in which:—

Figure 2 is a partial end view of the stator, showing two slots with the conductors in section.

Figure 3 represents a partial section taken longitudinally through the stator.

Figures 4 and 5 are diagrams showing how the compensation is carried out by groups of two conductors and by groups of four conductors, respectively.

Figure 1:
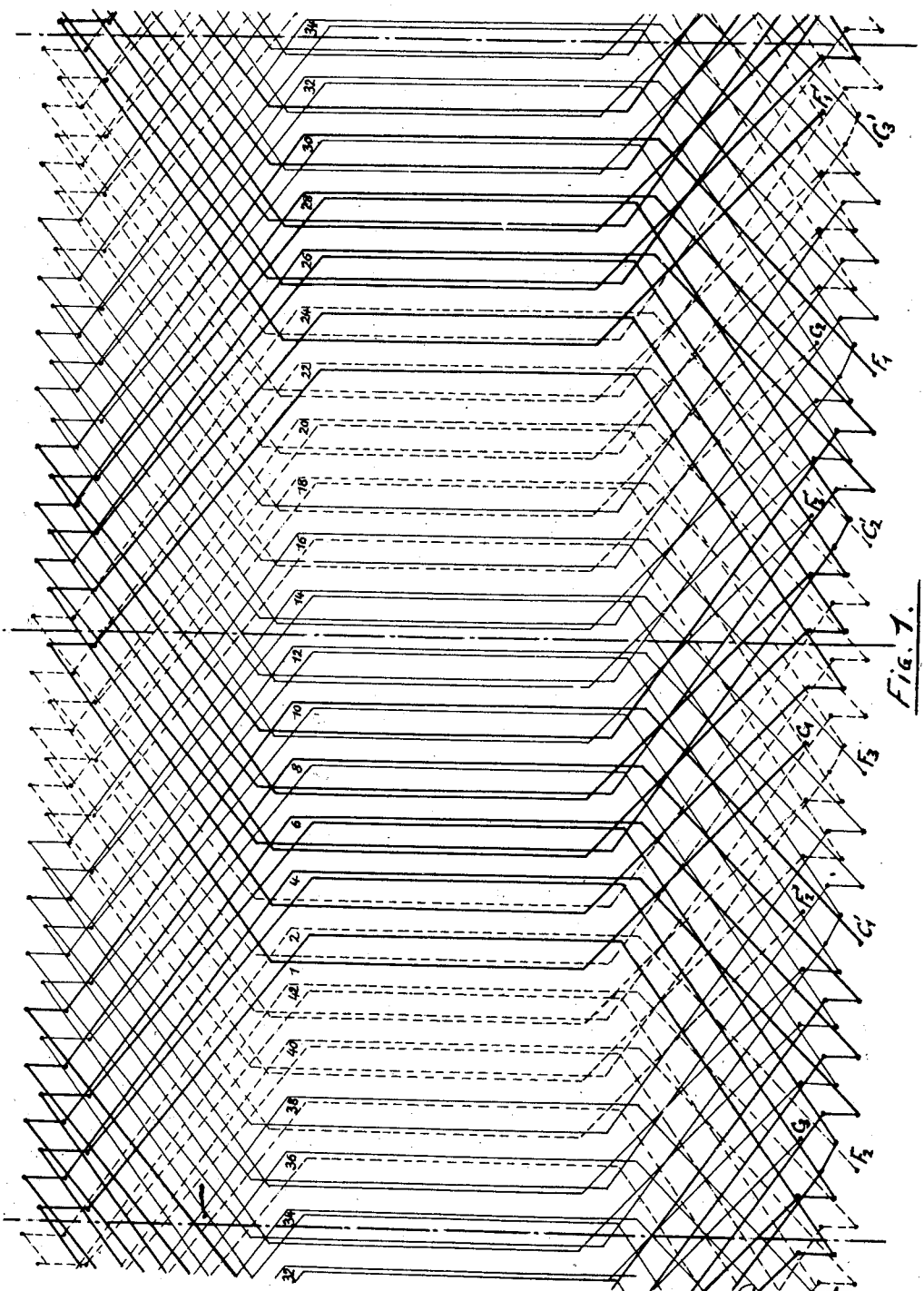
Figure 1 represents diagrammatically in development a three-phase, two-pole alternator stator lap winding having fractional pitch, according to the present invention.

Referring to Figure 1, each of the forty-two stator slots encloses two conductors; the winding has thus seven slots per phase per pole, the number of slots per phase per pole being understood to mean the quotient of the number of conductors divided by the product of the number of poles and the number of phases. The three phases are represented respectively one in thick lines, the second in thin lines, and the third in dotted lines. The terminal or connecting side is the lower end of the diagram, corresponding to the reference letters $C_1$ $F_1$ $C_2$ $F_2$ $C_3$ $F_3$ and $C'_1$ $F'_1$ $C'_2$ $F'_2$ $C'_3$ $F'_3$. Each phase includes two independent open windings, one wound progressively and the other wound retrogressively. The two windings of the first phase, for example, shown in thick lines, may be traced as follows:—

(1) From $C_1$, up the slot 1 to the top of the diagram, down slot 22 to the bottom of the diagram, up the (unnumbered) slot 3, down slot 24, up the (unnumbered) slot 5, down slot 26, up the (unnumbered) slot 7, down slot 28, up the slot 5 again, down slot 26 again, up the slot 7 again, down slot 28 again, up the (unnumbered) slot 9, down slot 30, to point $F_1$. Thus the slots 5, 7, 26 and 28 each contain two conductors of this same phase; such slots are hereafter referred to as "slots of category E."

(2) From $C'_1$, up the slot 10 to the top of the diagram, down the (unnumbered) slot 31 to be found on the right of the diagram, back on the left to the bottom of the diagram, up the slot 8, down the (unnumbered) slot 29, up slot 6, down the (unnumbered) slot 27, up slot 4, down the (unnumbered) slot 25, up slot 6 again, down the slot 27 again, up slot 4 again, down slot 25 again, up slot 2, down the (unnumbered) slot 23, to point $F'_1$. Thus the slots 4, 6, 25 and 27 each contain two conductors of this same phase, being therefore also of the "category E".

It will be noted that the stator winding terminals or external connections $F_2$ $C'_1$ $F_3$ $C'_2$ $F_1$ and $C'_3$ are arranged together with certain junction points of the windings in one plane at the lower end of the diagram, and that the other stator terminals $C_3$ $F'_2$ $C_1$ $F'$ $C_2$ $F'_1$ are arranged together with certain other junctions in another plane near this end; between these two planes are two other planes containing the remainder of the junction points, which represent the positions of the evolute end-connectors in the actual machine. Similarly at the top end of the diagram, which represents the side of the stator opposite to that at which the terminals or external connections $C_1$ $F_1$ etc. are located, the various junctions of the winding, representing the evolute end-connectors, are contained in four planes; these four planes of evolutes or connectors are shown more clearly at the right hand side of Figure 3, viz:—

One plane containing the connectors 1, a second plane containing the connectors 2, a third plane containing the connectors 3, a fourth plane containing the connectors 4. It will thus be clear that by the term plane of connectors, there is to be understood a plane perpendicular to the axis of the machine; for example in Fig. 3, all the connectors 1 extending from alternate slots all round the stator must be in a single plane or layer perpendicular to the shaft.

These several planes can readily be identified in Fig. 1; for example at the upper end of the diagram, being the side opposite to the terminals or external connections $C_1$ $F_1$ etc. the left-hand conductor in the slot 4 stops at the first or innermost plane, the right-hand conductor in the same slot 4 stops at the next or second plane, the left-hand conductor in the slot 1 stops at the third plane, and the right hand conductor in the same slot 1 stops at the fourth or outermost plane.

The evolute end-connectors of the first two planes turn in one direction, while those of the other two planes, the furthest distant from the stator mass, turn in the contrary direction, as indicated at the upper end of Figure 1.

The winding is likewise arranged so that one conductor 2 (see Figure 2) near the air gap, situated in one slot, shall be connected to a conductor 4 near the air gap in another slot, while a bottom conductor 1 of one slot is connected to a bottom conductor 3 of another slot.

The stator winding represented in Figure 1 comprises two categories of slots from the point of view of the dispersion flux; those containing two conductors of the same phase, which for the sake of explanation will be called "slots of category E", and those containing two conductors of different phases, which will be dominated "slots of category F".

In Figure 1, the slots 4 to 7, 11 to 14, 18 to 21, 25 to 28, 32 to 35, and 39 to 42, are of the category E, whilst the slots 1 to 3, 8 to 10, 15 to 17, 22 to 24, 29 to 31, and 36 to 38, are of the category F.

The winding (see Figure 1) is carried out in such a way that on the side opposite to the stator terminals, a conductor from a slot of category E is always connected to a conductor from a slot of category E, and a conductor from a slot of category F is always connected to a conductor from an identically similar slot (as regards the dispersion flux of the slot) of category F; this is necessary for obtaining complete compensation of the electromotive forces induced by the dispersion flux of the slots.

In Figure 1, the conductors of the slot 1, for example of category F, are connected on the side opposite to the external connections, to the conductors of the slot 22, likewise of category F and identically similar to the slot 1 as regards the dispersion flux of the slots.

The conductors which are to be connected together are then selected as above explained in order to effect the compensation of the electromotive forces induced by the dispersion flux; for example the conductors 2 and 4, realizing the conditions of compensation and presenting themselves in front of one another at A and B, Figure 3; these conductors being composed of laminations, a simple folding on the flat of these laminations, soldered separately one after another, allows the connection of these conductors 2 and 4, each lamination of the one conductor being soldered to the corresponding lamination of the other conductor in the order of presentation, so that there is no torsion or crossing in the mechanical sense of the laminations.

The laminations are insulated from one another at the side of the stator remote from the external connections, by thin mica papers and are only brought into contact on the side opposite to A and B (Figure 3), where they are soldered to bars shaped as circular evolutes and formed of solid copper.

In Figure 3, it can easily be seen that the laminations of the conductors 4 and 2, for example, represented also in the two slots in Figure 2, are automatically inverted in passing from one slot into the other, being connected as follows:—

The lamination or strip $a$ of the conductor 2, situated near the air gap, is connected to the lamination $h^1$ of the conductor 4; consequently, without having to twist the strips in the usual way during their connection together, there is obtained after the complete connection of the conductors 2 and 4 at A, B, the following inverted connection of the different strips or laminations of these conductors:—

$$a\ b\ c\ d\ e\ f\ g\ h$$
$$h^1\ g^1\ f^1\ e^1\ d^1\ c^1\ b^1\ a^1$$

This inversion of the order of the strips in passing from one slot to another is illustrated diagrammatically in Figure 4, which shows the conductor 2 joined as by soldering or the like operation to the conductor 4.

The compensation of the electromotive forces induced in the laminations by the transverse dispersion flux due to the passage of the alternating current in these laminations, is effected by grouping the slot conductors in twos, in such a way that by connecting pairs of laminations belonging to each two grouped conductors, the parasitic currents flowing in these laminations, due to the electromotive forces induced by the slot dispersion flux, shall be reduced to a minimum.

The winding is carried out in such a way that this compensation exists for all the groups of two conductors.

This simple form of carrying out the inversion of the laminations may be extended to a method of winding adapted to effect the compensation of the electromotive forces by groups of more than two conductors.

Thus the compensation may be effected by groups of any even number of conductors in the case where the circular evolutes on the two sides of the mass of the stator laminations are formed of laminated copper. The compensation might be carried out by groups of four conductors, for example, according to Figure 5.

The same method of compensation, by groups of an even number of conductors situated at the same depth in the slots, can evidently be applied in the case of a winding comprising more than two conductors per slot.

The advantages of the improved method of winding, forming the subject of the invention, are the following:—

(1) Suppression of the supplementary losses in question by a simple and economical construction.

(2) Robustness and security of working resulting from the absence of the crossing of the laminations or connectors.

What I claim is:—

1. In an alternating current electrical machine stator, an end-connector comprising a portion of the insulated laminations of a first conductor, a portion of the insulated laminations of a corresponding conductor, the corresponding conductor being one situated at the same depth in another slot identical as regards dispersion flux with the slot in which the first conductor is situated, each of said portions projecting from the respective stator slot and being bent up flatwise of the laminations in a different plane perpendicular to the stator axis, and the respective extremities of said portions being bent over towards one another flatwise of the laminations, and a plurality of insulated and soldered joints between the respective laminations in said bent-over extremities.

2. In an alternating current electrical machine stator having two conductors in each stator slot, a pair of adjacent end-connectors connecting a pair of conductors in one of said slots with other conductors of corresponding radial positions and subject to slot dispersion fluxes equal to the first mentioned pair of conductors, said end-connectors comprising portions of the insulated laminations constituting the respective conductors, each of said portions projecting from the respective stator slot and being bent up transversely of the laminations in a different plane perpendicular to the stator axis, and the extremities of said portions being bent over towards each other in pairs, and a plurality of insulated and soldered joints between the respective laminations in each of said pairs of bent over extremities, the jointed laminations of each pair of bent over extremities occupying different angular positions relative to the stator axis.

In testimony whereof I hereunto affix my signature.

MAURICE CORNU.